(12) United States Patent
Thioub

(10) Patent No.: US 11,612,227 B2
(45) Date of Patent: Mar. 28, 2023

(54) APPARATUS SECURABLE TO FLEXIBLE STRAND(S)

(71) Applicant: Kiyawmi Thioub, Cincinnati, OH (US)

(72) Inventor: Kiyawmi Thioub, Cincinnati, OH (US)

(73) Assignee: Kiyawmi Thioub, Cincinnati, OH (US)

( * ) Notice: Subject to any disclaimer, the term of this patent is extended or adjusted under 35 U.S.C. 154(b) by 0 days.

(21) Appl. No.: 17/184,635

(22) Filed: Feb. 25, 2021

(65) Prior Publication Data

US 2021/0270347 A1 Sep. 2, 2021

Related U.S. Application Data

(60) Provisional application No. 62/983,481, filed on Feb. 28, 2020.

(51) Int. Cl.
*A45D 8/34* (2006.01)
*F16G 11/10* (2006.01)
*F16G 11/14* (2006.01)

(52) U.S. Cl.
CPC ............... *A45D 8/34* (2013.01); *F16G 11/10* (2013.01); *F16G 11/143* (2013.01); *F16G 11/146* (2013.01)

(58) Field of Classification Search
CPC .......... A45D 8/34; A45D 8/004; F16G 11/10; F16G 11/143; F16G 11/146
See application file for complete search history.

(56) References Cited

U.S. PATENT DOCUMENTS

| | | | | |
|---|---|---|---|---|
| 3,099,271 A * | 7/1963 | Dubelier | ................... | A45D 8/34 132/273 |
| 5,687,751 A * | 11/1997 | Villani | ...................... | D04D 1/04 132/270 |
| 5,778,904 A * | 7/1998 | Elsner | ....................... | A45D 8/34 132/275 |
| 5,967,151 A * | 10/1999 | Villani | ................... | F16G 11/101 132/270 |
| 6,314,969 B1 * | 11/2001 | Lacause | .................... | A45D 8/34 132/275 |
| 8,171,639 B2 * | 5/2012 | Jaykins | ................. | A44C 5/0069 63/3.1 |
| 2003/0005557 A1 * | 1/2003 | Renn | ...................... | B65D 63/16 24/115 G |
| 2003/0121126 A1 * | 7/2003 | Buscart | ................. | F16G 11/101 24/115 G |
| 2009/0255551 A1 * | 10/2009 | Taylor | ...................... | A45D 8/006 132/275 |
| 2012/0005865 A1 * | 1/2012 | Boden | ................... | F16G 11/101 24/136 R |
| 2013/0167866 A1 * | 7/2013 | Wright | ...................... | A45D 8/34 132/273 |
| 2014/0137388 A1 * | 5/2014 | Campbell | .............. | F16G 11/042 29/461 |
| 2014/0311518 A1 * | 10/2014 | Ferreira | ................... | A45D 8/36 132/273 |
| 2015/0027479 A1 * | 1/2015 | Lei | ........................... | A45D 8/34 132/273 |
| 2018/0298983 A1 * | 10/2018 | Dershem | ................ | F16G 11/143 |
| 2020/0271193 A1 * | 8/2020 | Benavidez | ............ | F16G 11/046 |

* cited by examiner

*Primary Examiner* — David M Upchurch
(74) *Attorney, Agent, or Firm* — Abbey A. Lopez

(57) ABSTRACT

An apparatus that attaches an aesthetic or a functional object, serves bounding means, and is securable to flexible strand(s) is disclosed; such is significant, for example, when styling hair or adding a hook to a piece of yarn.

5 Claims, 2 Drawing Sheets

APPARATUS SECURABLE TO FLEXIBLE STRAND(S)

CROSS-REFERENCES TO RELATED APPLICATIONS

Figure 1:
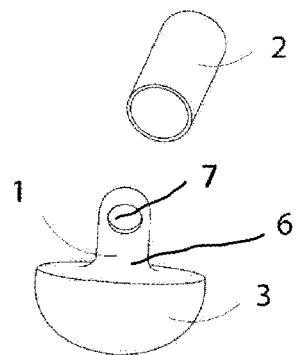

This application claims the benefit of U.S. Provisional Patent Application No. 62/983,481, filed Feb. 28, 2020.

BACKGROUND OF THE INVENTION

Technical Field

The present invention relates generally to the attachment of an article along the length of flexible strand(s).

Background Art

Strand(s) flexible enough to be looped with some degree of manual manipulation may be used to secure some article along its length. Other than tying said flexible strand(s) to the article itself, some intermediary (i.e.—hook, hole, screw, glue) may be used between the two. An adjustable lanyard does so while presenting the option for a portion of flexible strand(s) to be stored and hidden from visibility without the use of advanced machinery. Some lanyards even do so while enabling the user to adjust, and lock in place, a visible length of strand for an intentional interval of time. The application of the intermediary may also in turn bound the strands. Generally, there are many ways to bound flexible strand; some of which, undesirably constrict the strands which they bound, as is the case, for example, when rubber banding hair.

BRIEF SUMMARY OF THE INVENTION

The present invention is an apparatus that attaches an aesthetic or a functional object, serves bounding means, and is securable to flexible strand(s).

BRIEF DESCRIPTION OF THE SEVERAL VIEWS OF THE DRAWING(S)

The labeled components are:
1. Holding Structure
2. Securing Implement(s)
3. Article or Mass for Function or Aesthetic Purpose
4. Flexible Strand(s)
5. Concealing Implement
6. Body
7. Hole
8. Hollow Portion
9. Second Hole FIG. 1—Angled view of a preferred embodiment where the holding structure is a spool having a hole through its body, that is permanently attached to a semi-spherical mass, while the securing implement is a tube stretchable along its width.

Figure 2:
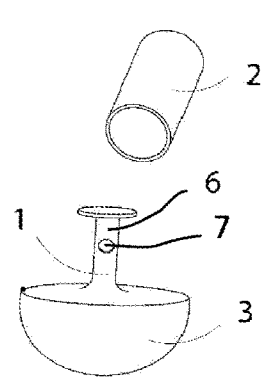

FIG. 2—Angled view of a preferred embodiment where the holding structure is a spool, with an inlayed and protruding portion, having a hole through its body, that is permanently attached to a semi-spherical mass, while the securing implement is a tube stretchable along its width.

Figure 3:
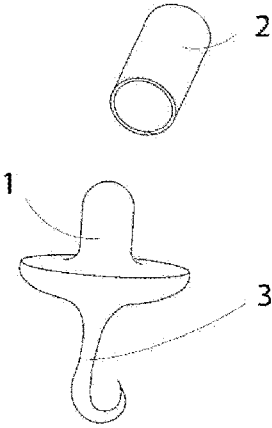

FIG. 3—Angled view of a preferred embodiment where the holding structure is a spool, that is permanently attached to a hook, while the securing implement is a tube stretchable along its width.

Figure 4:
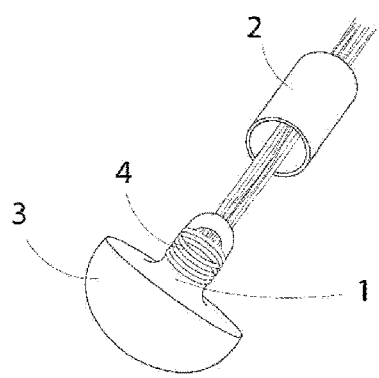

FIG. 4—Angled view of a preferred embodiment as in FIG. 1, with hair strands wrapped around the holding structure and securing implement ready to be maneuvered into place.

Figure 5:
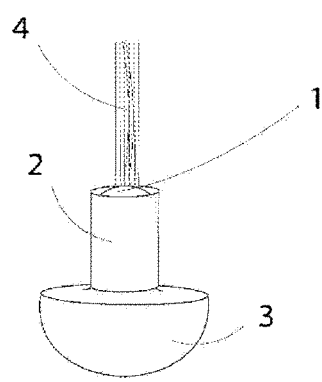

FIG. 5—Angled view of a preferred embodiment as in FIG. 1, with all components in final position.

Figure 6:
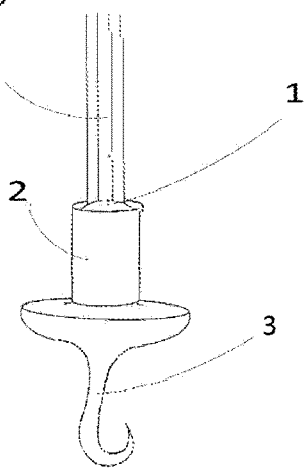

FIG. 6—Angled view of a preferred embodiment as in FIG. 3, with all components in final position.

Figure 7:
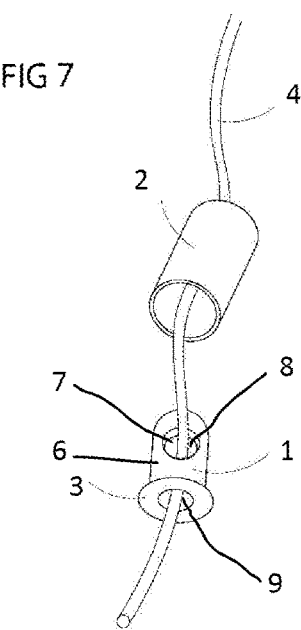

FIG. 7—Angled view of a preferred embodiment, strung along a length of a strand, where the holding structure has a hole through its body, that is perpendicular to a hollow portion of its latitudinal center, permanently attached to a flat cylinder with a hole through its vertical center, while the securing implement is a tube stretchable along its width.

Figure 8:
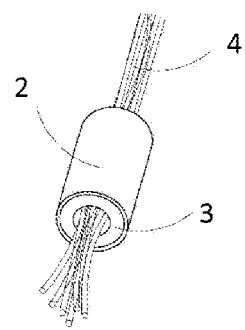

FIG. 8—Angled external view of a preferred embodiment, as in FIG. 7, with securing implement in place.

Figure 9:
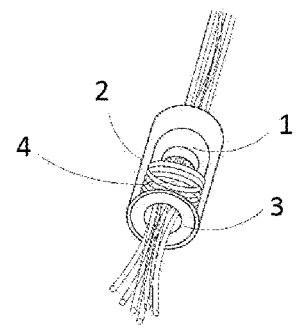

FIG. 9—Angled x-ray perspective of a preferred embodiment, as in FIG. 7, with securing implement in place.

Figure 10:
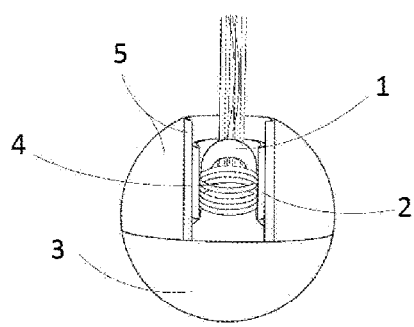

FIG. 10—Angled x-ray perspective of a preferred embodiment, as in FIG. 1, appropriately surrounded by a concealing implement with all components in final position.

Figure 11:
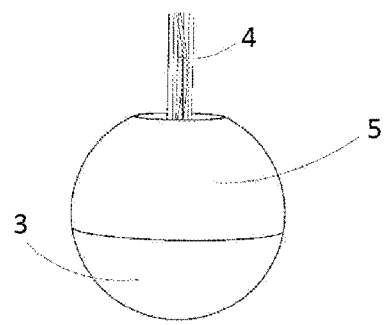

FIG. 11—Angled view of a preferred embodiment, as in FIG. 1, appropriately surrounded by a concealing implement with all components in final position.

DETAILED DESCRIPTION OF THE INVENTION

The following comprise the present invention:
(1) holding structure,
(2) securing implement(s),
(3) article or mass for aesthetic or functional purpose.

The following are involved in the usage of the present invention:
(4) strand(s) flexible enough to be to be looped with some degree of manual manipulation,
(5) concealing implement(s) (optional).
(6) body
(7) hole
(8) hollow portion
(9) second hole The above components exhibit the following relation:
(1) serves as means to store a length of (4). (2) secures the length of (4), stored by means of (1), in place. (3) is an attachment to (1) that is intended to be permanent. Optionally, (5) furthers the aesthetic or function of (3).

The present invention works as follows:
1. By means inherent to (1), some length of (4) is stored within or onto the body of (1).
2. (2) is positioned to hold in place the length of (4) stored by means of (1).
3. (3) is now able to fulfill its' aesthetic or functional purpose while being securely fastened to (4) by means of (1) and (2).
4. Optionally, (5) is applied to the combination of (1), (2), or (3) to further the aesthetics or function of (3).

In one preferred embodiment, as in FIG. 1 or FIG. 2, the holding structure is a spool having a hole (7) through its body (6) that is permanently attached to a semi-spherical mass (3) while the securing implement (2) is a tube stretchable along its width. Consider an adequate length and thickness of hair attached to one's scalp (4). Some length of (4) is inserted and passed through the hollow portion of (2) and the hole of (1). Following, a length of (4) is wrapped around the body (6) of (1). (2) is then maneuvered along the length of (4), to surround, by being manually stretched along its width, the combination of (1) and (4), as depicted in FIG.

4, securing, by the stretch along its width relaxing after the removal of manual manipulation, the length of (4) stored by means of (1) in place. (3) now serves aesthetic purpose while being securely fastened to (4) by means of (1) and (2), as depicted in FIG. 5.

A spool holding structure need not have a hole in its body. In one preferred embodiment, as in FIG. 3, the holding structure is a spool (1) that is permanently attached to a hook (3) while the securing implement is a tube stretchable along its width (2). Consider an adequate length and thickness of yarn (4). Some length of (4) is inserted and passed through the hollow portion of (2) and wrapped around the body of (1). Then, (2) is maneuvered along the length of (4) to surround, by being manually stretched along its width, the combination of (1) and (4), securing, by the stretch along its width relaxing after the removal of manual manipulation, the length of (4) stored by means of (1) in place. (3) is now available to fulfill its functional purpose while being securely fastened to (4) by means of (1) and (2), as depicted in FIG. 6.

Additional means may be used to further aesthetic or function of (3). Such is depicted, in FIG. 10 and FIG. 11, for a preferred embodiment, as in FIG. 1, using a concealing implement to create a spherical structure that is securely fastened to (4) by means of (1) and (2).

In one preferred embodiment, as in FIG. 7, the holding structure has a hole (7) through its body (6), that is perpendicular to a hollow portion (8) of its latitudinal center (1), permanently attached to a flat cylinder with a second hole (9) through its vertical center (3), while the securing implement is a tube stretchable along its width (2). Consider an adequate length and thickness of hair attached to one's scalp (4). Some length of (4) is inserted and passed through the hollow portion (8) of (1), (2), and (3). (4) is then wrapped around the body of (1), before (2) is maneuvered, to surround, by being manually stretched along its width, the combination of (1) and (4), securing, by the stretch along its width relaxing after the removal of manual manipulation, the length of (4) stored by means of (1) in place. Now, as depicted in FIG. 8 and FIG. 9, (3) fulfills its function of being passed through by a length of (4) while being securely fastened to (4) by means of (1) and (2).

To make pieces of the present invention, several common production techniques including additive manufacturing (i.e.—3D printing), injection molding, and hand sculpting, shaping, fashioning may be used. Assembly may be necessary to complete the production of an entire component such as adhering (1) and (3) together.

The invention claimed is:

1. An apparatus comprising:
a holding structure comprising a body and a hole through the body, wherein the holding structure is configured such that a length and thickness of flexible strands are inserted into the hole and wrapped around the body of the holding structure,
a securing implement comprising a hollow tube having an interior and an exterior, wherein the securing implement is configured to have a relaxed state and a stretched state, wherein the hollow tube is stretchable along a width of the hollow tube in the stretched state to surround the length and thickness of the flexible strands that is wrapped around the body of the holding structure at the interior of the hollow tube, and wherein at the relaxed state the securing implement secures the flexible strands to the holding structure,
a mass serving aesthetic or functional purpose; and
a concealing implement that surrounds the securing implement and at least a portion of the holding structure.

2. The apparatus of claim 1, wherein said holding structure and mass serving aesthetic or functional purpose consist of a single element.

3. The apparatus of claim 1, wherein the mass serving aesthetic or functional purpose comprises a semi-spherical mass.

4. An apparatus comprising:
a holding structure comprising a body and a hole through the body, wherein the holding structure is configured such that a length and thickness of flexible strands are inserted into the hole and wrapped around the body of the holding structure,
a securing implement comprising a hollow tube having an interior and an exterior, wherein the securing implement is configured to have a relaxed state and a stretched state, wherein the hollow tube is stretchable along a width of the hollow tube in the stretched state to surround the length and thickness of the flexible strands that is wrapped around the body of the holding structure at the interior of the hollow tube, and wherein at the relaxed state the securing implement secures the flexible strands to the holding structure,
a mass serving aesthetic or functional purpose comprising a hook.

5. An apparatus comprising:
a holding structure comprising a body and a hole through the body, wherein the holding structure is configured such that a length and thickness of flexible strands are inserted into the hole and wrapped around the body of the holding structure,
a securing implement comprising a hollow tube having an interior and an exterior, wherein the securing implement is configured to have a relaxed state and a stretched state, wherein the hollow tube is stretchable along a width of the hollow tube in the stretched state to surround the length and thickness of the flexible strands that is wrapped around the body of the holding structure at the interior of the hollow tube, and wherein at the relaxed state the securing implement secures the flexible strands to the holding structure,
a mass serving aesthetic or functional purpose,
wherein the hole in the holding structure is perpendicular to a hollow portion of a latitudinal center of the holding structure, wherein the mass serving aesthetic or functional purpose is configured as a flat cylinder, and wherein the holding structure is permanently attached with the flat cylinder with a second hole through a vertical center of the second hole, wherein a length and thickness of flexible strands is inserted and passed through the hollow portion of the holding structure and the second hole in the flat cylinder.

* * * * *